G. A. PEELMAN.
BRIDLE ATTACHMENT.
APPLICATION FILED JAN. 31, 1912.
1,052,749.
Patented Feb. 11, 1913.
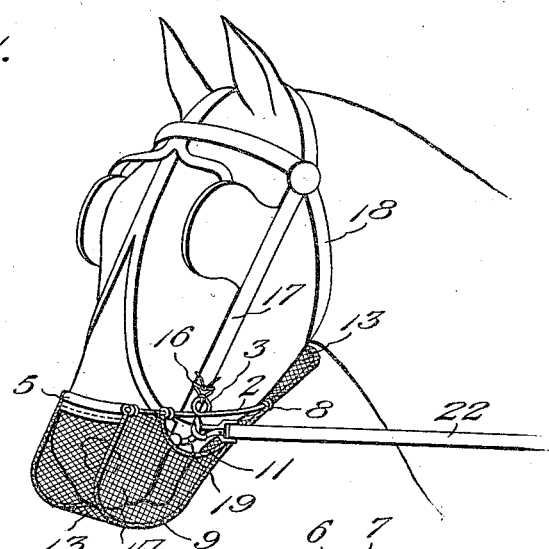
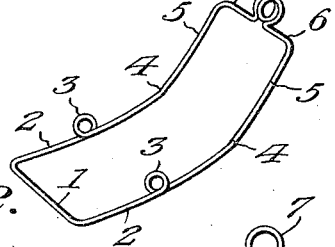
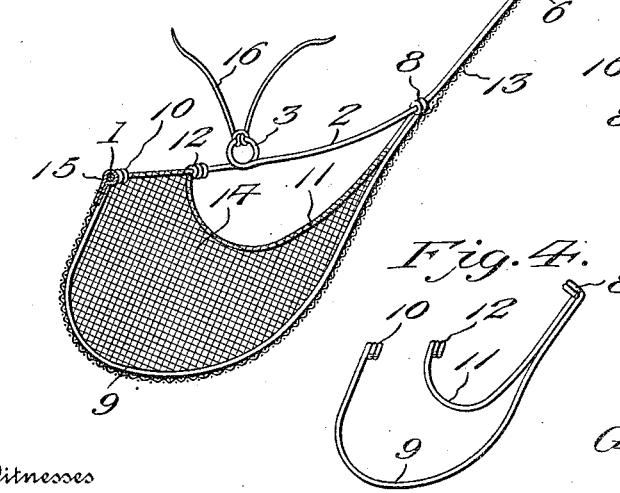
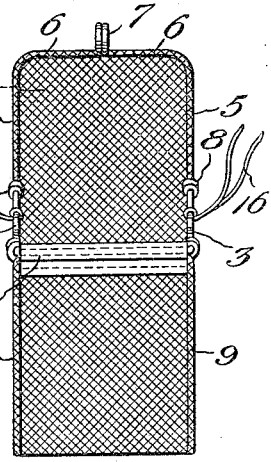
Inventor
George A. Peelman
Witnesses
Edwin F. McKee
Annie J. Hind
By George W. Sues
Attorney

UNITED STATES PATENT OFFICE.

GEORGE A. PEELMAN, OF SURREY, NORTH DAKOTA.

BRIDLE ATTACHMENT.

1,052,749. Specification of Letters Patent. Patented Feb. 11, 1913.

Application filed January 31, 1912. Serial No. 674,459.

*To all whom it may concern:*

Be it known that I, GEORGE A. PEELMAN, a citizen of the United States, and a resident of Surrey, in the county of Ward and State of North Dakota, have invented certain new and useful Improvements in Bridle Attachments, of which the following is a specification, reference being had to the accompanying drawings.

This invention relates to certain new and useful improvements in horse-bridle attachments, and comprises a light, readily attachable, ventilated muzzle arranged to be movably connected to a bridle to shield and protect the animal's nostrils, mouth and lower jaw against bot flies and other insects; and the object of my invention is to provide a device of this general character of a simple and inexpensive nature, and of a durable construction, arranged so that the same can be readily attached or detached from the horse's bridle.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views: Figure 1 shows a perspective view of the attachment in use. Fig. 2 shows a lengthwise sectional view. Fig. 3 is a detached detail of the main carrying frame. Fig. 4 shows a detached detail of one of the side frame members. Fig. 5 is a front view.

During certain seasons of the year farm horses are greatly annoyed and not infrequently injured by bot flies and other insects attaching themselves at points from which the draft animals in their harnessed condition cannot readily detach them. After a bot fly or other insect has succeeded in alighting on the nostril or jaw of a harnessed field horse, the animal is practically helpless and must endure the torment of the insect until the same is satisfied. In my present invention, I provide a light, simply constructed, readily attachable muzzle, which serves as a guard and protects the nostrils, mouth and lower jaw of the animal.

In carrying out the aim of my invention, I make use of a rectangular wire carrying frame, as shown in Fig. 3, comprising the forward portion 1, the two similar parallel side bars or portions 2, which are provided with the strapped loops 3. As shown in Fig. 3, the frame is bent to provide an angle at the points marked 4 from which the rear portions 5, 5 of the frame extend. This rear portion extends at an angle to the forward portion, as clearly shown. The rear side frame portions 5, 5 are continued in the rear frame members 6 which end in the loops 7, which loops are held in juxtaposition. Secured to this carrying frame are two similar side frame members, each comprising a single length of wire, including a short bow 11 and a long bow 9, both of these bows as shown in Fig. 4, extending from a securing coil 8, which is common to both of the said bows. As shown the short bow 11 ends in the coil 12 which twines about the main frame as is disclosed in Fig. 2, while the long bow 9 ends in the coil 10 secured to the forward portion 1 of the carrying frame. As shown in Fig. 2, the short bow 11 has its end 12 secured forward of the strap receiving loop 3. In securing the side frame members to the carrying frame, the coil 8 is located at the angle of the frame marked by the numerals 4.

Secured to the rear portion 6 of the carrying frame is a ventilated screen which is preferably made of wire netting or other suitable material. This screen, marked 13 in the drawings, is suitably secured to the portions marked 5 of the carrying frame, the long loops 9, and the forward portion 1 of the carrying frame, as clearly shown in Fig. 2. Each side frame member is further provided with a ventilated shield also preferably made of wire netting, these side shield members 14 being secured to the long bows 9, the short bows 11, and that portion of the carrying frame 2 between the coils 12 and 10, as is shown in Fig. 2.

This construction provides an access opening between the forward portion of the carrying frame 2 and the short loop 11 and it is within this access opening that the bit ring 19 of the bridle is located, as is shown in Fig. 1. With this arrangement, the lines 22 can be readily attached to the bit rings.

In order to attach the muzzle to the bridle, the operator passes the neck strap 18 through the loops 7, while suitable thongs 16 are placed within the loops 3, these thongs then being tied to the cheek strap 17 of the bridle. By means of these thongs and the rings 7, the muzzle is loosely attached to the bridle, so that the muzzle will shake with every movement of the horse's head. This shaking movement of the muzzle will contribute toward keeping the flies and insects away.

In front I cover the bar 1 and the upper border of the ventilated screen 13 by means of a covering 15, which may be of leather, rubber or other suitable material so that the forward portion of the muzzle will not injure the horse's nose.

These muzzles are of course made in various sizes. The muzzle is further simple and inexpensive in construction and both durable and efficient in operation, and the adjustment of the muzzle upon the bridle or the removal therefrom may be effected with ease, accuracy and despatch.

Having thus described my said invention, what I claim as new and desire to secure by United States Letters Patent is:

1. A device of the character described having in combination, a rectangular wire carrying frame, two similar side members each comprising a single length of wire including a short and a long bow extending from a common securing coil encompassing said carrying frame, each bow ending in a coil, that of the long bow being secured to the front portion of said carrying frame, and the coil of the short bow to the side portion of said frame intermediate of its ends, a ventilated screen extending from the rear part of said carrying frame and secured to said long bows and to the front part of said carrying frame, and a ventilated screen secured to each short bow and the carrying frame between said bows.

2. A device of the character described having in combination, a rectangular wire carrying frame, the rear portion extending at an angle to the forward portion and terminating in two loops held in juxtaposition, the forward portion of said frame having two oppositely positioned side loops, two similar side frame members each comprising a single length of wire including a short and a long bow extending from a common securing coil encompassing said carrying frame at the point where said rear portion angles away from the forward portion, each bow ending in a coil, that of the long bow being secured to the front bar of said carrying frame, and the coil of the short bow to the side portion of said frame intermediate of its ends, a ventilated screen extending from the rear part of said carrying frame and secured to said long bows and the front part of said carrying frame, and a ventilated screen secured to each short bow and the carrying frame between said bows.

3. A device of the character described having in combination, a rectangular wire carrying frame, the rear portion extending at an angle to the forward portion and terminating in two loops held in juxtaposition, the forward portion of said frame having two oppositely positioned side loops, two similar side frame members each comprising a single length of wire, including a short and a long bow extending from a common securing coil encompassing said carrying frame at the point where said rear portion angles away from the forward portion, each bow ending in a coil that of the long bow being secured to the front bar of said carrying frame, and the coil of the short bow to the forward portion of said frame intermediate of its ends, a ventilated screen extending from the rear part of said carrying frame and secured to said long bows and to the front part of said carrying frame, a ventilated screen secured to the rear side, each of said short bows and the carrying frame between said bows, and a thong within said side loops.

In testimony whereof I affix my signature, in presence of two witnesses.

GEORGE A. PEELMAN.

Witnesses:
O. D. LAGRANGE,
J. K. NESIRK.

---

Copies of this patent may be obtained for five cents each, by addressing the "Commissioner of Patents, Washington, D. C."